United States Patent [19]
Miller et al.

[11] Patent Number: 5,820,663
[45] Date of Patent: Oct. 13, 1998

[54] PHOSPHATE ESTER ASPHALT ADDITIVES

[75] Inventors: John C. Miller, Hawthorn Woods, Ill.; Stephen J. Vicenzi, Edgerton, Wis.

[73] Assignee: Vitech International Inc., Janesville, Wis.

[21] Appl. No.: 986,946

[22] Filed: Dec. 8, 1997

[51] Int. Cl.⁶ .................................................. C09D 195/00
[52] U.S. Cl. ..................................... 106/284.1; 106/281.1
[58] Field of Search ............................... 106/284.1, 281.1

[56] References Cited

U.S. PATENT DOCUMENTS

| | | | |
|---|---|---|---|
| 2,592,564 | 4/1952 | Hardman | 106/284.1 |
| 2,693,425 | 11/1954 | Hardman | 106/284.1 |
| 2,848,429 | 8/1958 | Woodruff et al. | |
| 3,033,930 | 5/1962 | Talley | |
| 4,410,367 | 10/1983 | LeGrand | 428/404 |
| 4,786,329 | 11/1988 | Chag et al. | 104/284.1 |
| 5,519,073 | 5/1996 | vand der Werff et al. | 524/62 |

OTHER PUBLICATIONS

*Emulsions and Solubilization,* Kozo Shinoda & Stig Friberg, John Wiley & Sons, 1986 no month available (Title Page Only).

ASTM Standard Designation: D 1664–80 (Reapproved 1985) no month available, *Standard Test Method for Coating and Stripping of Bitumen–Aggregate Mixtures.*

*Primary Examiner*—David Brunsman
*Attorney, Agent, or Firm*—John G. Premo

[57] ABSTRACT

Phosphate esters of asphalt soluble, nonionic, monohydric alcohol surfactants having an HLB No. between 8–18 are odor-free low dosage anti-stripping additives for asphalt.

7 Claims, No Drawings

PHOSPHATE ESTER ASPHALT ADDITIVES

FIELD OF THE INVENTION

The invention relates to anti-stripping agents for asphalt.

BACKGROUND OF THE INVENTION

The use of petroleum residuum such as asphalt as a paving material and other construction material is well known. It is also well known that it is desirable to include in such compositions anti-stripping additives so as to reduce the tendency of the paving material which consists of the asphalt and an aggregate material from deteriorating during inclement weather conditions. During the winter months the low temperatures tend to stiffen and reduce the flexability of the asphalt binder in the paving material. Under these conditions and with traffic loadings the pavement tends to crack. When this happens, surface water can easily seep into the pavement. As the water goes through freeze-thaw cycles, it strips the asphalt from the aggregate surfaces, reduces the pavement's strength and accelerates deterioration. During the summer months, high temperatures can cause the asphalt pavement to become so soft that traffic can permanently deform the material creating shoving, rutting, bleeding and flushing problems.

The incorporation of an anti-stripping additives into asphalt compositions employed in preparing pavements increases the life of these pavements. Most anti-stripping agents contain amines. When these amine additives are added to hot asphalt undesirable odors are produced. Also, amine additives are used in large amounts in order to provide satisfactory anti-stripping effects. It would be desirable to have anti-stripping additives which were odorless when present in hot asphalt paving products, would improve adhesion to the aggregate material and would give good results when used at low economical dosages. Also desirable, would be an additive which would provide beneficial results when added to a wide variety of asphalt products such as cut back asphalts, roofing coatings and cold patch asphaltic materials. All materials of these types are included in the term, "asphalt" as used herein and in the claims. A good description of several conventional asphalts is set forth in U.S. Pat. No. 2,848,429 which is incorporated herein by reference. The invention is primarily directed to paving grade asphalts containing aggregates.

SUMMARY OF THE INVENTION

The invention in its broadest aspects comprises an asphalt composition containing a major portion of asphalt and a minor, effective amount of an anti-stripping agent comprising an asphalt soluble phosphate ester of a nonionic, monohydric alcohol surfactant having an HLB number within the range of 8–18. Exemplary of such materials are the C6–C12 alkyl phenols which have been reacted with from 1–12 moles of ethylene oxide. Desirably, the alkyl phenol contains a C8–C10 alkyl group.

The preferred amount of ethylene oxide which is reacted with the alkyl phenol is 2–10 moles. Products containing 2–4 moles of ethylene oxide will perform very well.

The phosphate ester is desirably a mixed ester. Mixed esters should contain at least 10 mole % of the monoester. Pure mono, di and tri esters also may be used. The esters are readily prepared by reacting phosphorus pentoxide or polyphosphoric acid with the nonionic surfactant emulsifiers described using known esterification techniques.

The asphalt composition advantageously contains a phosphate ester which is a mixture of mono and di-esters. When the phosphate ester is a mixture of diesters it should contain 50 mole % (about 65 weight % of diester) and 50 mole % (about 35% of monoester) for optimal results to be obtained when added to asphalt. An example of such a preferred mixed ester is the phosphate diester of nonyl phenol which contains 9 moles of reacted ethylene oxide. This ethoxylate has an HLB No. of about 13. It is hereafter referred to as, "Composition 1".

DETAILED DESCRIPTION OF THE INVENTION

The Asphalt Soluble Phosphate Esters

As indicated, the phosphate esters are asphalt soluble. The free acid form of the esters is the most desirable from the standpoint of generating beneficial results. The solubility, and in some instances the HLB number can be adjusted by partially or fully neutralizing any free acid groups of the ester with metal ions. These ions are preferably alkaline earth metals most desirably calcium. Other heavy metal salts such as copper, zinc, cobalt, iron, aluminum and the like may be used. Alkali metal salts of the phosphate esters tend to render the molecules to hydrophilic, hence interfering with their effectiveness as anti-stripping agents.

Listed below in Table 1 are illustrative monohydric alcohol, surfactants along with their HLB Nos. which may be used to prepare the phosphate esters used in the practice of the invention. More detailed information about HLB Nos. may be found in the publication, Emulsions and Solubilization, Kozo Shinoda & Stig Friberg, John Wiley & Sons, 1986, which is incorporated herein by references.

TABLE 1

| Name | Chemical Designation | HLB No. |
|---|---|---|
| Atlas G-2142 | Polyoxyethylene monooleate | 11.1 |
| Myrj 45 | Polyoxyethylene monostearate | 11.1 |
| Atlas G-2141 | Polyoxyethylene monooleate | 11.4 |
| PEG 400 monooleate | Polyoxyethylene monooleate | 11.4 |
| Atlas G-2127 | Polyoxyethylene monolaurate | 12.8 |
| Igepal CA-630 | Polyoxyethylene alkyl phenol | 12.8 |
| Atlas G-1690 | Polyoxyethylene alkyl aryl ether | 13 |
| PEG 400 monolaurate | Polyoxyethylene monolaurate | 13.1 |
| Atlas G-1794 | Polyoxyethylene castor oil | 13.3 |
| Myrj 49 | Polyoxyethylene monostearate | 15.0 |
| Atlas G-2079 | Polyoxyethylene glycol monopalmitate | 15.5 |
| Atlas G-3820 | Polyoxyethylene cetyl alcohol | 15.7 |
| Atlas G-2162 | Polyoxyethylene oxypropylene stearate | 15.7 |
| Myrj 51 | Polyoxyethylene monostearate | 16.0 |
| Myrj 52 | Polyoxyethylene monostearate | 16.9 |

The phosphate esters of the invention in addition to providing odor free additives when added to hot asphalt are effective in imparting anti-stripping effects at low economical dosages. A general range for the amount of phosphate ester described that may be added to asphalt to provide effective anti-stripping results between 0.05–2.0% by weight. A more preferred range is between 0.25–1.5% with a range between 0.25–1.25% giving good results in most instances. Dosage of course will depend on the phosphate ester used, the type of asphalt and the nature of the aggregate.

EXAMPLES

To illustrate the several advantages of the invention the following data is presented.

3

Example 1

Evaluation for Odors in Liquid Anti-Stripping Agents

The purpose of this evaluation was to determine if there was an odor that was emitted from hot samples (140° C.) of 85/100 asphalt cement when mixed with Composition 1 and available anti-stripping agents on the market. The methodology used was as follows:

1. Prepare 3×300 grams of 85/100 asphalt in 1 liter cans.
2. Place lids on the cans and place in heated oven.
3. Heat samples of asphalt to 140° C. for 1 hour.
4. Weigh in (1.0%) 3 grams of liquid anti-stripping agent per asphalt sample.
5. Repeat step 4 three (3) times. Total of 3 different liquid anti-stripping agents.
6. Place lids on each sample and return to oven at 140° C. for 30 minutes.
7. Remove one can at a time and determine if sample has a noxious odor.

TABLE 2

Results of Evaluation for Odors in Liquid Anti-Stripping Agents

| PRODUCT | ODOR |
| --- | --- |
| Composition 1 | No Odor |
| Commercial Amine Additive A | Slight Odor |
| Commercial Amine Additive B | Strong Amine Odor |

Composition 1 did not produce any odor when mixed into the heated (140° C.) asphalt cement (85/100) at a quantity of 1.0%.

Example 2

Evaluation for Performance of Liquid Anti-Stripping Agents

Method 1

The evaluation for performance of anti-stripping agent was completed by following the MTO LS-285, Method of Test for Stripping by Static Emersion, which is described generally in ASTM Standard Designation D1664-80 entitled "Standard Test Method for Coating and Stripping of Bitumen Aggregate Mixtures." The levels of liquid anti-stripping agent used in this study were 0.25%, 0.50%, 0.75%, 1.00% and 1.25%. The heat stability test was completed to 96 hours, 24 hours more than the required current MTO test method.

Sample Preparation

The asphalt cement used in this study was an 85/100 penetration grade and an HL1 Stone (Dolomitic Sandstone).

The blend of asphalt cements to liquid anti-stripping agent were as follows: 0.25%, 0.50%, 0.75%, 1.00%, and 1.25%. Asphalt cement samples were prepared with the stated levels of anti-stripping agents. The HL1 stone was washed prior to testing to remove all dust that was adhering to the aggregates. The stone was washed to eliminate the concerns for lack of bonding of the asphalt cement/anti-stripping agent blends to the aggregate surfaces due to the dust.

Findings and Discussions

The results of the study are shown in Table 3. A control sample was completed using 0.00% anti-stripping agent with 85/100 asphalt cement mixed with the HL1 stone and subjected to the static emersion test. It had 40–45% retained coating.

TABLE 3

Anti-Stripping Agent Evaluation
Composition 1
Percent Retained Coating

| Additive Level (%) | Initial | 1 Day | 2 Days | 3 Days | 4 Days |
| --- | --- | --- | --- | --- | --- |
| 0.25 | 80–85 | 80–85 | 70–75 | 55–60 | 60–65 |
| 0.50 | 80–85 | 80–85 | 75–80 | 75–80 | 65–70 |
| 0.75 | 85–90 | 85–90 | 85–90 | 75–80 | 75–80 |
| 1.00 | 100 | 95–100 | 90–95 | 85–90 | 80–85 |
| 1.25 | 100 | 95–100 | 95–100 | 90–95 | 85–90 |

Notes:
1. Control with 85/100 and 0% anti-stripping agent was 40–45% retained coating.
2. Asphalt used was 85/100.
3. Aggregate used was HL1 Stone.
4. The bold numbers indicate that the asphalt appeared to have emulsified on the surface of the aggregate after the static emersion. However there was no evidence of emulsification on the surface of the water.
5. During the heat stability testing there was a slight odor from the oven set at 177° C., but no ventilation was required. At this temperature, there will always be "emissions" from asphalt cement.
6. At Day 4 of the heat stability testing, the samples prepared with 0.5%, 0.75%, 1.0%, and 1.25% had a skin on the surface that required some effort to mix back in. This was probably caused by the heating and aging to which the asphalt cement was subjected and that the lids on the sample cans were not sealed tight.

There appreared to be random samples of asphalt cement/anti-stripping agent blends with the aggregate, after the static emersion test, where the asphalt had a brown appearance yet was still adhering to the aggregate. As well, with these samples there were no signs of emulsified asphalt residue on the surface of the water.

During the heat stability test at 177° C. there was slight odor but no ventilation was required. The odor appeared to be that of overheated asphalt and was most likely a result of heating the asphalt cement to 177° C. and holding the samples at this temperature for 96 hours. At this temperature there will always be "emissions" coming from asphalt cement.

At Day 4 several of the asphalt cement/anti-stripping agent blends had a skin build up on the surface of the samples in the sample cans. This is most likely due to the heating and aging to which the asphalt cement was subjected since the lids on the sample cans were not sealed tight. With the aging of the asphalt cement blends the viscosity of the asphalt increased and hence when mixed with the aggregates there was more effort required in getting the aggregates well coated prior to the static emersion test.

Composition 1 liquid anti-stripping agent provides consistent results on the retained coating test and shows a high level of performance in meeting MTO requirements for 65% retained at 0.50% liquid anti-stripping agent at Days 3 and 4.

Example 3

Using the same test methods described above, the partial and full sodium salts of Composition 1 were evaluated. In these tests appreciable skinning was observed and the additives did not appear to remain soluble in the treated asphalt.

Conclusions

Based on the findings and the results of the study, the following conclusions are evident:

1. Composition 1 does not produce an odor when mixed with hot asphalt cement and maintained at a temperature of 177° C.
2. Composition 1 meets or exceeds the minimum requirements as set out in MTO LS-285, Method of Test for Stripping by Static Emersion and the heat stability testing to 96 hours.
3. Composition 1 met the 65% minimum requirement for retained coating at the 0.5% level after 96 hours at 177° C.

Composition 1 provides excellent performance based on the Stripping by Static Emersion and extended (96 hours) heat stability testing.

We claim:

1. An asphalt composition comprising a major portion of asphalt and a minor, effective amount of an anti-stripping agent comprising an asphalt soluble phosphate ester of a nonionic, monohydric alcohol surf actant having an HLB No. between 8–18.

2. The asphalt composition of claim 1 where the phosphate ester is a mixed ester which contains at least 10 mole % of the monoester.

3. The asphalt composition of claim 2 where the mixed phosphate ester is a mixture of mono- and diesters.

4. The asphalt composition of claim 2 where the phosphate ester is an alkyl phenol which contains a C6–C12 alkyl group and has been reacted with 1–12 moles of ethylene oxide.

5. The asphalt composition of claim 4 where the alkyl phenol contains a C8–C10 alkyl group and has been reacted with 2–10 moles of ethylene oxide.

6. The asphalt composition of claim 4 where the phosphate ester is a phosphate ester of nonyl phenol reacted with 9 moles of ethylene oxide.

7. The asphalt composition of claim 6 where the phosphate ester is mixture containing about 50 mole % of diester and about 50 mole % of monoester.

* * * * *